United States Patent [19]
Anson

[11] Patent Number: 5,297,596
[45] Date of Patent: Mar. 29, 1994

[54] DETERGENT DISPENSER

[75] Inventor: James H. Anson, Auburn, Ill.

[73] Assignee: Bunn-O-Matic Corporation, Springfield, Ill.

[21] Appl. No.: 986,584

[22] Filed: Dec. 7, 1992

[51] Int. Cl.⁵ .......................... B65B 3/00; B67C 11/00
[52] U.S. Cl. ....................................... 141/98; 222/460; 99/300; 99/323.3; 141/85; 141/90; 141/331; 141/340; 141/342
[58] Field of Search ...................... 222/460; 141/98, 85, 141/90, 91, 331, 341, 340, 342, 343; 99/300, 323.3

[56] References Cited

U.S. PATENT DOCUMENTS

| | | | |
|---|---|---|---|
| 2,524,243 | 10/1950 | Wicklund | 141/342 |
| 2,696,336 | 12/1954 | Van Drunen | 141/341 |
| 2,762,527 | 9/1956 | Manley | 141/364 X |
| 3,245,437 | 4/1966 | Holz | 222/478 X |
| 4,191,101 | 3/1980 | Ogawa et al. | 99/323.3 |
| 4,357,861 | 11/1982 | DiGirolamo | 99/323.3 |
| 4,635,825 | 1/1987 | Tulasne | 141/91 X |
| 4,667,709 | 5/1987 | Fischer et al. | 141/91 |
| 5,134,925 | 8/1992 | Bunn et al. | |

*Primary Examiner*—Ernest G. Cusick
*Attorney, Agent, or Firm*—Trexler, Bushnell, Giangiorgi & Blackstone, Ltd.

[57] ABSTRACT

A dispensing assembly in combination with a beverage brewing apparatus for controllably dispensing and directing a cleaning material into a brewing chamber of the beverage brewing apparatus. The brewing chamber has a receiving mouth through which the cleaning material is dispensed. The dispensing assembly includes a hinge part, a funnel body, and components to finding a hinge joint. The funnel body is generally conically shaped, having a pouring port at one end and a dispensing port at the opposite end. The pouring port is enlarged relative to the dispensing port forming the conical shape of the funnel body and facilitating ease and accuracy in dispensing a cleaning material into the brewing chamber. The funnel body is attached to the hinge part and is hingedly associated with the hinge joint for movably positioning the funnel body into and out of communication with the receiving mouth of the brewing chamber. The hinge joint and hinge part are cooperatively attached close to the receiving mouth to prevent the funnel body from being undesirably mispaced in the brewing apparatus and to insure proper alignment of the dispensing port with the receiving mouth when placed in communication therewith.

9 Claims, 3 Drawing Sheets

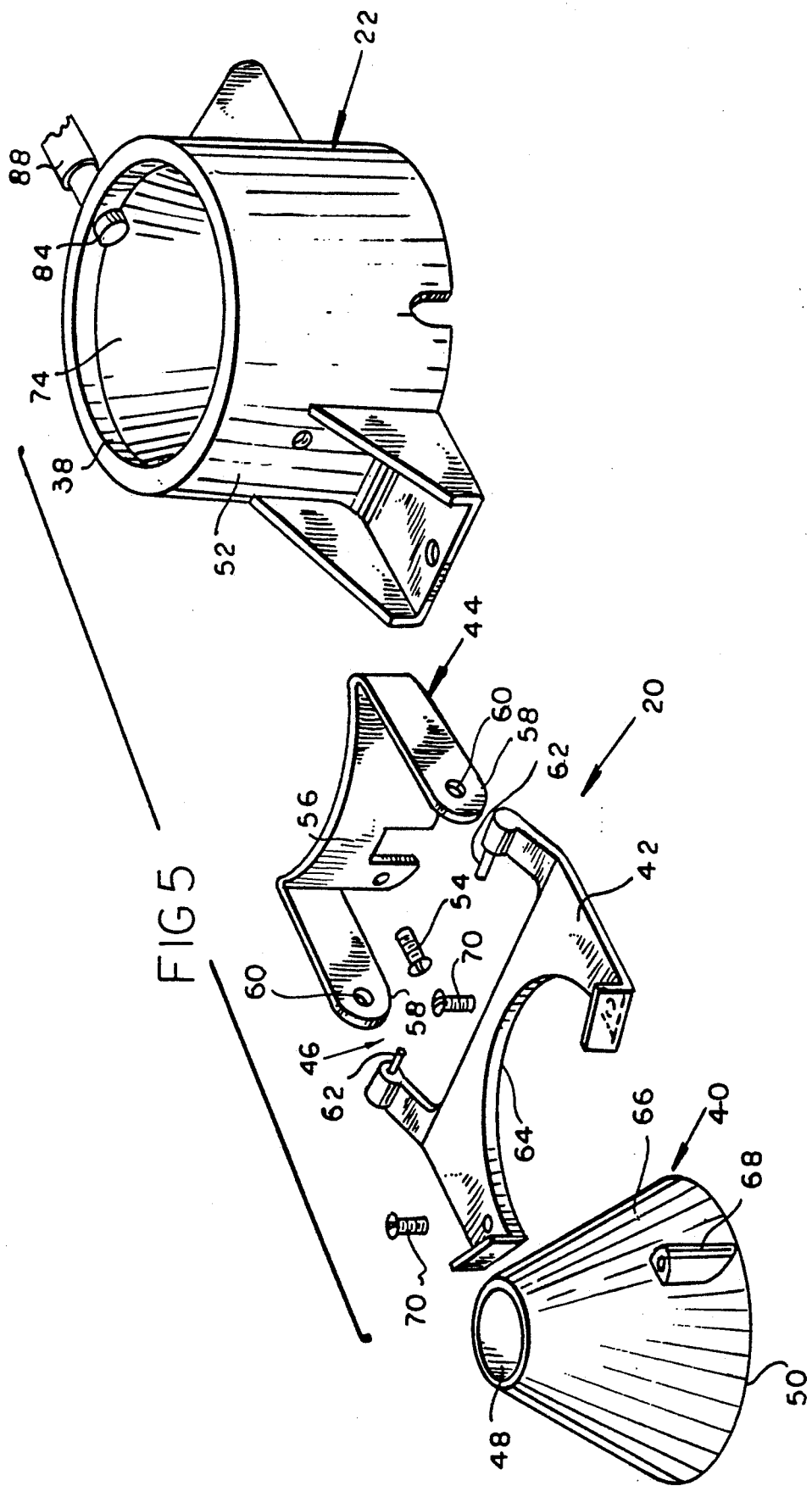

DETERGENT DISPENSER

BACKGROUND OF THE INVENTION

The present invention relates to devices for facilitating clean and efficient dispensing of detergent substances into a beverage brewing apparatus for cleaning the apparatus and preventing spilling of the detergent substance on the apparatus.

Various forms of beverage brewing apparatus are available. For example, there are manual apparatus as well as automatic apparatus. A typical beverage brewing apparatus, regardless of whether it is manual or automatic, infuses a brewing substance with a quantity of heated water. The brewing substance is retained in a filter and the infusing water is introduced and allowed to seep through the brewing substance and drain through the filter.

An example of an automatic beverage brewing apparatus can be found in U.S. patent applications Ser. No. 07/683,285 to Bunn, et al., filed Mar. 26, 1992, and U.S. patent application Ser. No. 07/818,850 to Bunn, et al., filed Aug. 30, 1991 (a continuation of Ser. No. 07/683,285). The above-mentioned applications both show automatic beverage brewing apparatus which have brewing chambers for brewing a beverage therein. The brewing apparatus as shown in these two examples also include a device for delivering a selected quantity of a selected beverage brewing substance to the brewing chamber. The device for delivering the substance includes storage hoppers and an assembly for dispensing material from the hoppers. A discharge chute of the dispensing assembly is positioned to deliver beverage brewing substances dispensed from the hoppers to the brewing chamber.

It is desirable to periodically clean the beverage brewing apparatus to remove oils and particulate matter left over from the brewing process. Further, it is desirable to remove any beverage brewing substances from the filter which may not have been removed during a flush cycle. Therefore, in order to clean the beverage brewing apparatus it is necessary to deposit a cleaning material or detergent substance into the brewing chamber portion of the apparatus to facilitate cleaning.

A variety of cleaning materials are available for use in cleaning the brewing chamber. The cleaning materials include liquids, powders, flakes, and range from colorless and odorless to colored and having a distinct and undesirable taste.

A problem arises in dispensing the cleaning material into the brewing chamber. Generally, the discharge chutes from the hoppers are in close proximity over a receiving mouth of the brewing chamber can be difficult. As such, pouring a cleaning material into the brewing chamber. Further, such apparatus quite often have limited frontal or side access and as such create further obstacles in dispensing cleaning material into the brewing chamber.

One way of overcoming these obstacles is to place a funnel in the receiving mouth and dispense the cleaning material into the funnel. While this achieves the goal of placing cleaning material into the brewing chamber, this is a limited solution. A problem with using a funnel is that the funnel is a loose component. Loose components create a problem because they are likely to become lost and may interfere with the mechanical operation of the apparatus if left in the apparatus.

When loose components, such as funnels, become separated from the apparatus with which they were designed to be used, the replacement funnels which are used often are not the proper size and may result in complications when dispensing a cleaning material into the brewing chamber. Additionally, if a funnel does not work properly, an operator may attempt to avoid using a funnel and dispense the cleaning material directly into the receiving mouth of the brewing chamber.

As mentioned above, there is limited space within the brewing apparatus and therefore use of an improperly sized funnel or the absence of a funnel may result in spilling the cleaning material inside the brewing apparatus. The brewing apparatus employs heated water to infuse the beverage brewing substance in the brewed chamber to created a brewed beverage therefrom. Due to the brewing process and the heated water used therein, the ambient humidity level inside of the brewing apparatus is somewhat elevated. As such, it is highly undesirable to have cleaning materials spilled inside of the beverage brewing apparatus in the elevated humidity level because such material may become liquified and seep into other parts of the beverage brewing apparatus or may become caked on the apparatus and cause further problems.

The beverage brewing apparatus operates by means of gears and motors to move various components of the beverage brewing apparatus during a brewing cycle. Heated water lines also run through the beverage brewing apparatus carrying water at at or near boiling temperatures. Because of the mechanical parts and elevated temperatures, a problem is created if a funnel is left in the beverage brewing apparatus in an undesirable location. If a loose component funnel is left inside the beverage brewing apparatus next to a heated water line, the funnel may melt, depending upon the type of plastic material, from the heat of the water line. The melted plastic may cause further complication in the beverage brewing apparatus. Additionally, if a loose component funnel is left in the beverage brewing apparatus and it is left in an undesirable position such that it becomes lodged in a mechanical component, or is vibrated by the operation of the apparatus so that it falls into a mechanical component, such interference with the mechanical components may cause problems.

As an additional matter, a funnel which is not designed for use with the beverage brewing apparatus may result in dispensing the cleaning material into an area, although located within the receiving mouth which may be undesirable. For example, the beverage brewing apparatus, as presented in the two patent applications referred to hereinabove, includes a receiving tube extending upwardly from the brewing chamber. The receiving tube has a mouth at a top end and a throat between the receiving tube and the brewing chamber. A rinse water line is connected to the receiving tube and dispenses a flow of rinse water into the receiving tube to flush particles from the brewing substances delivering device positioned above the receiving mouth down the receiving tube. If the funnel used to dispense cleaning material into the mouth of the receiving tube is incorrectly positioned, cleaning material may be dispensed into the receiving tube at a position above the rinse water nozzle. The cleaning material positioned above the rinse water nozzle will not be automatically flushed during a cleaning cycle and as such may later be vibrated or otherwise being knocked into the brewing chamber during a brewing cycle. A brewed beverage produced during a brewing cycle in which cleaning material is knocked into the brewing substance would be undesirable.

As a final matter, the automatic beverage brewing apparatus as presented in the two applications referred to hereinabove, reduce the amount of manual activity required to produce a brewed beverage. As such, it would be desirable to further eliminate any steps required in the cleaning of the beverage brewing apparatus.

OBJECTS AND SUMMARY OF THE INVENTION

A general object of the present invention is to provide a dispensing assembly for use with an automatic beverage brewing apparatus for controllably dispensing and directing a cleaning material into a brewing chamber of the automatic beverage brewing apparatus.

A more specific object of the present invention is to provide a dispensing assembly which permits a funnel body of the assembly to be moved into and out of communication with the beverage brewing apparatus.

Still another object of the present invention is to provide a dispensing assembly for controllably dispensing and directing a cleaning material into the brewing chamber which is attached to the brewing chamber and therefore prevents a loss or improper placement of the dispensing assembly.

Briefly, and in accordance with the foregoing, the present invention comprises a dispensing assembly in combination with a beverage brewing apparatus for controllably dispensing and directing a cleaning material into a brewing chamber of the beverage brewing apparatus. The brewing chamber has a receiving mouth through which the cleaning material is dispensed. The dispensing assembly includes a hinge part, a funnel body, and components defining a hinge joint. The funnel body is generally conical shaped, having a pouring port at one end and a dispensing port at the opposite end. The pouring port is enlarged relative to the dispensing port forming the conically shape of the funnel body and facilitating ease and accuracy in dispensing a cleaning material into the brewing chamber. The funnel body is attached to the hinge part and is hingedly associated with the hinge joint for movably positioning the funnel body into and out of communication with the receiving mouth of the brewing chamber. The hinge joint and hinge part are cooperatively attached close to the receiving mouth to prevent the funnel body from being undesirably misplaced in the brewing apparatus and to insure proper alignment of the dispensing port with the receiving mouth when placed in communication therewith.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 5 is an exploded perspective view of the dispensing assembly of the present invention.

DETAILED DESCRIPTION OF THE INVENTION

Figure 1:
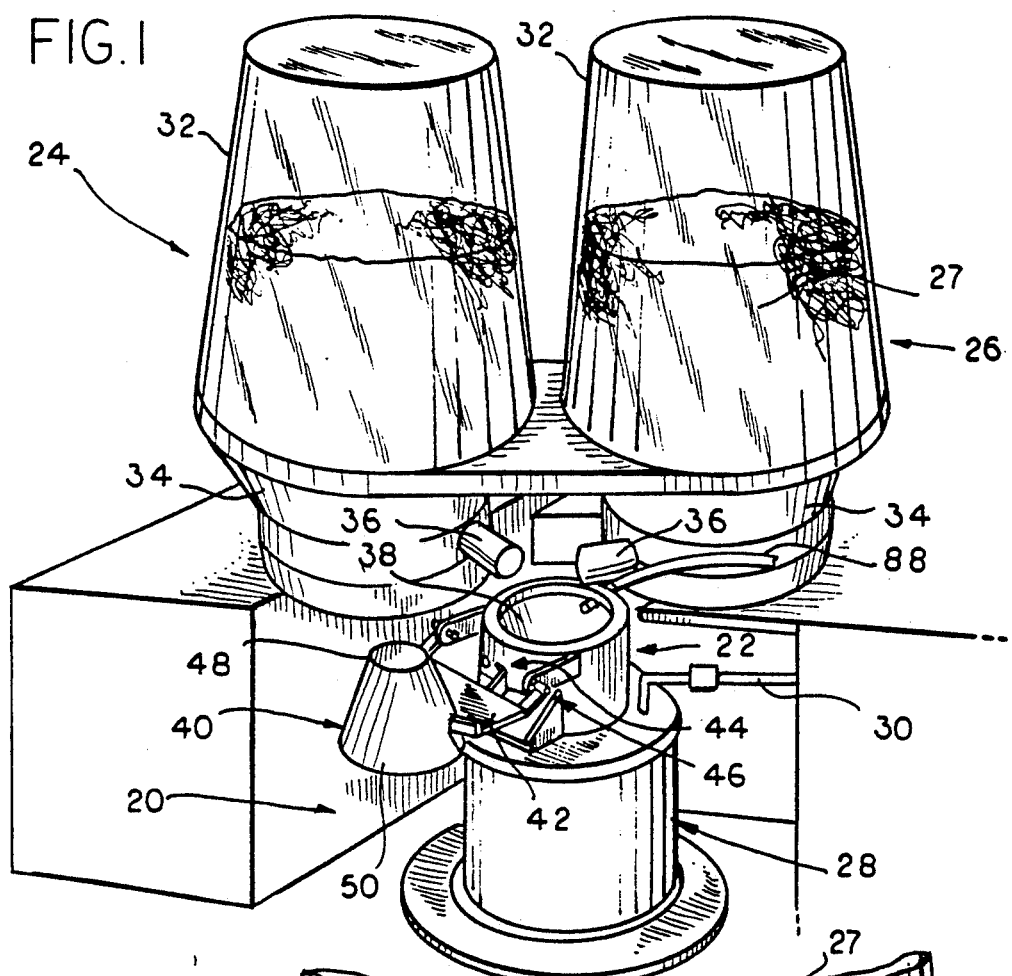
FIG. 1 is a front elevational view of a portion of a beverage brewing apparatus showing a dispensing assembly of the present invention in which a funnel body of the dispensing assembly is displaced from a receiving tube of the beverage brewing apparatus.

While the invention may be susceptible to embodiment in different forms, there is shown in the drawings, and herein will be described in detail, an embodiment with the understanding that the present disclosure is to be considered an exemplification of the principles of the invention and is not intended to limit the invention to that as illustrated and described herein.

Referring now to the drawings, wherein like parts are designated by the same reference number throughout the figures, a dispensing assembly 20 in accordance with the present invention is shown in FIG. 1 movably attached to a receiving tube 22 of a beverage brewing apparatus 24. Reference is made to the examples of automatic beverage brewing apparatus shown in U.S. patent application Ser. No. 07/683,285 to Bunn et al. filed Mar. 26, 1992 and U.S. Ser. No. 07/818,850 to Bunn et al. filed Aug. 30, 1991 (a continuation of Ser. No. 07/683,285), which applications are both incorporated herein by reference.

While the entire apparatus 24 is not shown in FIG. 1, such an apparatus 24, for example as shown in both of the above referenced and incorporated U.S. patent applications, includes a device for dispensing a beverage brewing substance or storage hopper assembly 26 for controllably serving a selected quantity of beverage brewing substance 27 into a brewing chamber 28. Such an apparatus 24 also includes a heated water reservoir (not shown) to provide heated brewing water. Water is delivered to the brewing chamber 28 through a heated water fill line 30 to infuse the beverage brewing substance 27 dispensed into the brewing chamber 28 to extract a brewed beverage.

Figure 2:
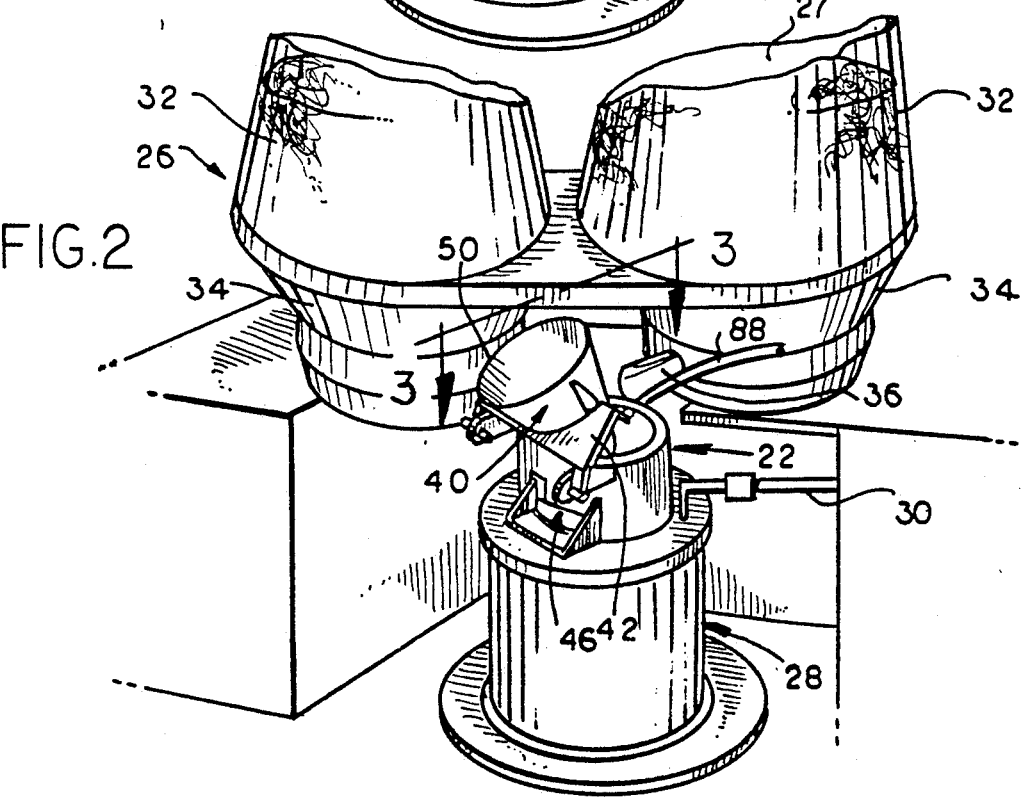
FIG. 2 is a front elevational view of the portion of the beverage brewing apparatus as shown in FIG. 1 in which the funnel body is positioned for communication with the receiving tube.

As further shown in FIGS. 1 and 2, the hopper assembly hopper 26 includes hollow hopper bodies 32 cooperatively positioned above a delivery device 34 for moving a desired quantity of brewing substance out of the hollow hopper body 32. A discharge chute 36 extending from the delivery device discharges brewing substance 27 into a receiving mouth 38 positioned above the brewing chamber 28.

As shown in FIG. 1, the dispensing assembly 20 has a funnel body 40 attached to a hinge part 42, a mounting bracket 44, and a hinge joint 46 positioned between the mounting bracket 44 and the hinge part 42. The structure and function of the dispensing assembly 20 permits the funnel body 40 to be moved completely out of the way of the receiving tube 22 and the discharge chutes 36. Even though the funnel body 40 is moved completely out of the way, it is not easily removable from the brewing apparatus 24 because it is retained on the mounting bracket 44 at the hinge joint 46.

Figure 3:
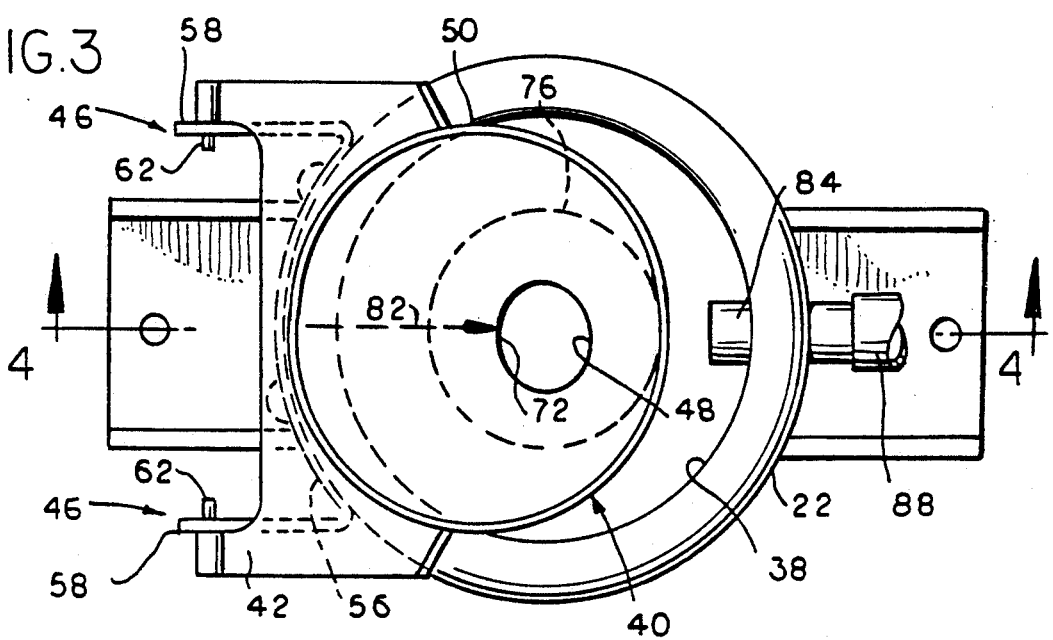
FIG. 3 is an enlarged partial fragmentary plan view of the dispensing assembly taken along line 3—3 in FIG. 2.
Figure 4:
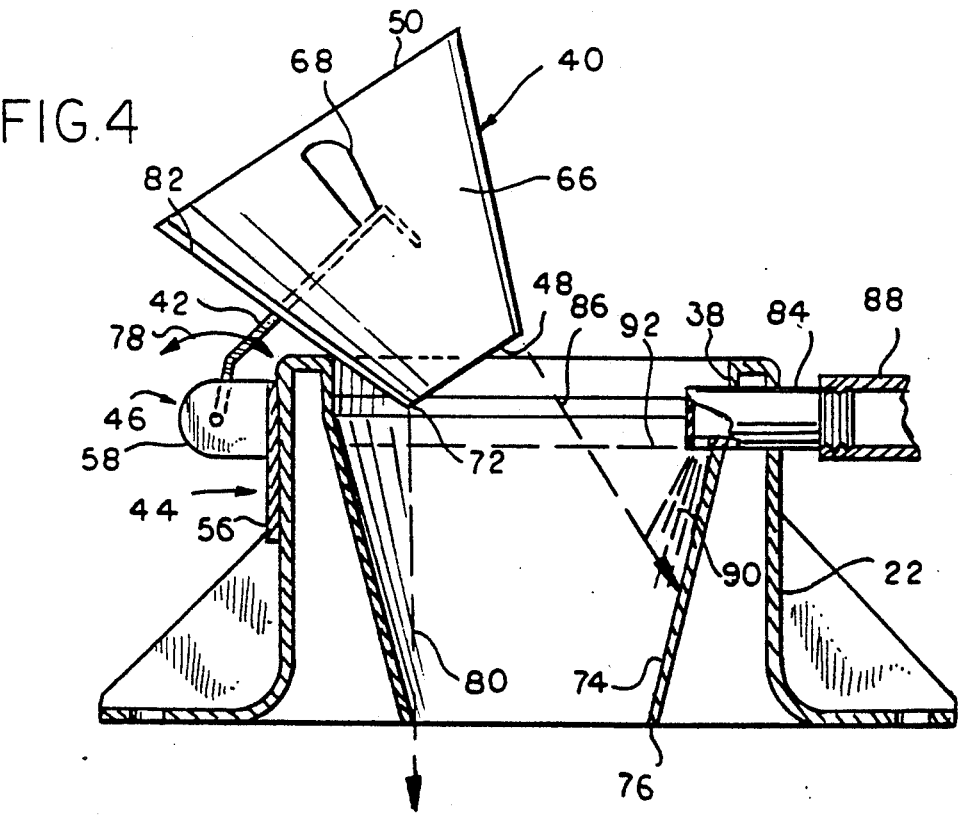
FIG. 4 is an partial fragmentary, cross sectional, side elevational view of the dispensing assembly taken along line 4—4 in FIG. 3.

When a cleaning material must be placed in the receiving tube 22, the funnel body 40 is rotated about the hinge joint 46 so that a dispensing port 48 is positioned in communication with the receiving mouth 38. With further reference to FIGS. 3 and 4, the dispensing port 48 is defined by the perimeter of the small end of the frusta conically shaped funnel 40. At the opposite end of the funnel 40 is the receiving end 50. The receiving end 50 is enlarged relative to the dispensing port 48 so that a larger target area is for receiving material into the funnel body 40. The frusta-conical shape of the funnel body 40 focuses the cleaning material poured into the receiving port 50 downwardly towards the dispensing port 48 which communicates with the receiving mouth 38. As such, materials poured into the receiving port 50 are directly deposited into the receiving mouth 38 without spilling cleaning material outside of the receiving mouth 38 and into the brewing apparatus 24.

With reference to FIG. 5, the dispensing assembly 20 is shown in an exploded perspective view. As shown, the funnel body 40 is detached from the hinge part 42. The hinge part 42 is detached from the mounting bracket 44 which in turn is detached from an outside surface 52 of the receiving tube 22. When assembled, the mounting bracket 44 is attached to the outside surface 52 of the receiving tube 22 by means of a fastener 54 through a base portion 56 of the mounting bracket 44. The base portion 56 is formed to cooperatively abut the outside surface 52.

Knuckles 58 extending away from the base 56 are formed with apertures 60 for receiving a pivot pin portion 62 of the hinge part 42. The apertures 60 and the knuckles 58 when engaged with the pivot pins 62 form the hinge joint 46.

The hinge part 42 includes a mating edge 64 which cooperatively abuts an outside surface 66 of the funnel body 40. Mounting buttresses 68 are formed on the outside surface 66 and extend away from the outside surface 66 to permit fasteners 70 to be driven through the hinge part 42 to engage the mounting buttresses 68 thereby retaining the funnel body 40 on the hinge part 42. Alternatively, the funnel body 40 and the hinge part 42 may be integrally formed as a unitary single piece body.

With reference to FIG. 4, the hinge part 42 and the funnel body 40 are sized and dimensioned so that when the funnel body 40 is placed in communication with the receiving mouth 38 a forward lip 72 of the dispensing port 48 extends into the receiving mouth 38. The forward lip 72 is defined by the circumference of the dispensing port 48 such that it is the lower most portion of the circumference of the dispensing port 48 when the funnel 40 is positioned in communication with the receiving mouth 38.

The receiving tube 22 is hollow and has an inside surface 74 which is generally conically shaped. The conical shape of the receiving tube 22 is enlarged towards the receiving mouth 38 and decreases in diameter towards a lower end defining a throat 76.

The receiving tube 22, funnel portion 40 and hinge part 42 are sized and dimensioned so that the forward lip 72 overhangs the throat 76 when the funnel 40 is rotated (as indicated by rotation path 78) to communicate with receiving mouth 38. The overhanging forward lip 72 provides a vertical drip path 80 which minimizes the contact with the inside surface 74 of the receiving tube 22. When material is poured into the funnel body 40, it follows a path along a lower inside surface 74 of the funnel 40 which defines a swale 82. Material flowing through the swale 82 is directed downwardly after passing through the dispensing port 48 and follows the vertical drip path 80 into the throat 76. The vertical drip path 80 helps to minimize contact between the cleaning material poured through the funnel body 40 and the inside surface 74 of the receiving tube 22.

The hollow receiving tube 22 also includes a rinse water head 84 projecting through the walls of the receiving tube 22 for emitting a flow of water onto the inside surface 74 to rinse brewing substance off of the inside surface 74. When material flowing through the funnel 40 follows a perpendicular path (as indicated by path arrow 86) relative to a plane defined by the dispensing port 48, the material may flow against the inside surface 74 of the receiving tube 22. When this occurs, a quantity of rinse water may be emitted through rinse water line 88 coupled to the rinse water head 84 to direct a rinse water flow 90 onto the inside surface 74 thereby rinsing the material off of the surface 74. The funnel body 40 and the hinge part 42 are sized and dimensioned for delivering cleaning material to a position inside the receiving tube 22 below a rinse water flow level 92. Since the funnel 40 delivers the cleaning material below the rinse water flow level 92, the cleaning material is thoroughly rinsed from the inside surface 74 of the receiving tube 22 thereby preventing the introduction of cleaning material into a brewed beverage dispensed through the receiving tube 22 after a cleaning cycle.

In use, the dispensing assembly 20 of the present invention is mounted in close relation to the receiving tube 22 which is positioned above the brew chamber 28 of the beverage brewing apparatus 24. A hinge joint 46 between the bracket 44 and the hinge part 42 facilitates hinged rotation (78) of the funnel body 40 into and out of communication with the receiving mouth 38 of the receiving tube 22.

When not in use, the funnel body 40 is rotated (78) out of communication with the receiving mouth 38 so as not to obstruct the flow of beverage brewing substance 27 dispensed from the storage hopper assembly 26 through the discharge chutes 36. Additionally, the funnel body 40 is securely retained on the hinge part 42 which in turn is movably retained on the bracket 44 to prevent the funnel body 40 from interfering with the operation of the brewing apparatus 24.

When a cleaning cycle is to be carried out cleaning material must be poured into the brew chamber 28. The funnel body 40 of the dispensing assembly 20 is rotated (78) into communication with the receiving mouth 38. When positioned as such, the dispensing port 48 is positioned with a forward lip 72 extending into the receiving mouth 38. The larger receiving end 50 is positioned at a desirable angle for receiving cleaning material therethrough. The cleaning material poured through the receiving end 50 follows the swale 82 through the funnel 40 under the force of gravity to the point where it is expelled through the dispensing port 48 into the receiving tube 22. The forward lip 72 is positioned over the throat 76 so that a vertical drip path 80 prevents unnecessary contact with an inside surface 74 of the receiving tube 22. A perpendicular flow path 86 is positioned below the rinse water flow level 92 so that in the event that cleaning material does come into contact with the inside surface 74 of the receiving tube 22, it can be rinsed by means of a quantity of rinse water dispensed through the rinse water head 84.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A dispensing assembly in combination with a beverage brewing apparatus for controllably dispensing and directing a cleaning material into said beverage brewing apparatus, said beverage brewing apparatus including a brewing chamber for brewing a beverage from a beverage brewing substance, said brewing chamber having a receiving mouth through which a beverage brewing substance is deposited in said brewing chamber for brewing a beverage, said dispensing assembly comprising:
   a hinge part;
   a funnel body cooperatively attached to said hinge part, said funnel body having a pouring port and a dispensing port, said dispensing port being smaller than said pouring port; and
   means for movably attaching said hinge part and attached funnel body proximate to said receiving mouth for positioning said dispensing port of said funnel body in communication with said receiving mouth of said beverage brewing apparatus.

2. A dispensing assembly as recited in claim 1, wherein said funnel body and hinge part are a unitary body integrally formed of a single piece of material.

3. A dispensing assembly as recited in claim 1, further comprising at least one pivot pin extending from said hinge part, said at least one pivot pin cooperatively engaging said attaching means defining a hinge joint about which said hinge part and attached funnel body rotate when moving said funnel body into and out of communication with said receiving mouth.

4. A dispensing assembly as recited in claim 1, further comprising:
   a hollow receiving tube protruding from said brewing chamber, said receiving mouth being disposed on an end of said receiving tube distal said brewing chamber;
   an opening between said hollow receiving tube and said brewing chamber defining a throat;
   a rinse water head positioned in said hollow receiving tube and communicating with a rinse water line for delivering a rinse water flow to a inside surface of said hollow receiving tube to rinse said inside surface of said hollow receiving tube; and
   a side of said funnel defining a swale, said swale being angled for delivering a cleaning material to a position in said hollow receiving tube below a rinse water flow of said rinse water head to promote thorough rinsing of said cleaning material from said receiving tube.

5. A dispensing assembly as recited in claim 4, further comprising:
   a forward lip of said funnel body being defined by the circumference of said dispensing port, said forward lip extending over an opening defined by said throat; and
   a vertical drip path being defined between said forward lip and said opening defined by said throat, said vertical drip path being generally perpendicular to said area defined by said throat for directing said cleaning material travelling along said swale in said funnel body downwardly into said throat without contacting said inside surface of said receiving tube.

6. A dispensing assembly as recited in claim 1, said attaching means further comprising:
   a mounting bracket cooperatively positioned proximate to said receiving mouth;
   a pivot pin extending from said hinge part;
   at least one knuckle extending from said mounting bracket for cooperatively receiving said pivot pin of said hinge part; and
   a hinge joint being defined by said pivot pin engaged with said at least one knuckle for providing a point of rotation of said hinge part and attached funnel body.

7. A dispensing assembly as recited in claim 6, said mounting bracket further comprising:
   a base portion for attaching said dispensing assembly in close proximity to said receiving mouth; and
   said at least one knuckle comprising a plurality of knuckles, each said knuckle extending from said base portion, each said knuckle having holes extending therethrough for cooperatively receiving said pivot pins of said hinge part, each said knuckle being flexible for allowing selective engagement and disengagement of said pivot pins from said holes in each said knuckle to remove said funnel body and hinge part from said mounting bracket.

8. A dispensing assembly as recited in claim 1, further comprising:
   said funnel body having a hollow, generally conical shape;
   mounting buttresses protruding from an outside surface of said funnel body;
   said hinge part having a generally planar shape; and
   fasteners extending through said hinge part and engaging said mounting buttresses for attaching said hinge part to said funnel body.

9. A dispensing assembly in combination with a beverage brewing apparatus for controllably dispensing and directing, a cleaning material into said beverage brewing apparatus, said beverage brewing apparatus including a brewing chamber for brewing a beverage from a beverage brewing substance, said brewing chamber having a receiving mouth through which a beverage brewing substance is deposited in said brewing chamber, and a brewing substance delivery device positioned proximate to said receiving mouth for delivering a predetermined selected quantity of brewing substance to said brewing chamber through said receiving mouth, said dispensing assembly comprising:
   a funnel body, said funnel body having a pouring port for receiving a cleaning material and a dispensing port, said dispensing port being positionable for extending into an area defined by said receiving mouth for dispensing the cleaning material received through said pouring port into said receiving mouth;
   a hinge part attached to said funnel body means for movably positioning said funnel body in communication with said receiving mouth;
   a mounting bracket cooperatively positioned proximate to said receiving mouth;
   a pivot pin extending from said hinge part;
   a knuckle extending from said mounting bracket for cooperatively receiving said pivot pin of said hinge part; and
   a hinge joint being defined by said pivot pin engaged with said knuckle for providing a point of rotation of said hinge part and attached funnel body.

* * * * *